United States Patent
Okumura

(10) Patent No.: US 6,198,201 B1
(45) Date of Patent: Mar. 6, 2001

(54) VIBRATION WAVE APPARATUS

(75) Inventor: Ichiro Okumura, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/320,283

(22) Filed: Jun. 2, 1999

(30) Foreign Application Priority Data

Jun. 3, 1998 (JP) ................................. 10-154708
Jun. 3, 1998 (JP) ................................. 10-154709

(51) Int. Cl.[7] ...................................................... H02N 2/00
(52) U.S. Cl. ............................... 310/323.03; 310/323.04; 310/323.05; 310/323.08; 310/323.09
(58) Field of Search ...................... 310/323.03, 323.04, 310/323.05, 323.06, 323.08, 323.09, 323.01, 323.02, 333

(56) References Cited

U.S. PATENT DOCUMENTS

| | | | |
|---|---|---|---|
| 4,580,073 | 4/1986 | Okumura et al. | 310/323 |
| 4,587,452 | 5/1986 | Okumura et al. | 310/328 |
| 4,678,956 | 7/1987 | Izukawa et al. | 310/323 |
| 4,692,650 | 9/1987 | Okumura et al. | 310/323 |
| 4,692,651 | 9/1987 | Hiramatsu et al. | 310/323 |
| 4,734,610 | 3/1988 | Okumuar et al. | 310/323 |
| 4,752,711 | 6/1988 | Tsukimoto et al. | 310/323 |
| 4,763,148 | 8/1988 | Tsukimoto et al. | 354/195.1 |
| 4,771,203 | 9/1988 | Mukohjima et al. | 310/323 |
| 4,788,468 | 11/1988 | Izukawa et al. | 310/323 |
| 4,810,923 | 3/1989 | Tsukimoto et al. | 310/323 |
| 4,937,488 * | 6/1990 | Fujie et al. | 310/323 |
| 5,017,823 | 5/1991 | Okumura | 310/323 |
| 5,032,754 * | 7/1991 | Iwao et al. | 310/323 |
| 5,099,166 | 3/1992 | Hirano et al. | 310/323 |
| 5,172,023 * | 12/1992 | Kawai et al. | 310/323 |
| 5,300,850 | 4/1994 | Okumura et al. | 310/323 |
| 5,554,905 * | 9/1996 | Gschwind et al. | 310/323 |
| 5,585,685 | 12/1996 | Maeno et al. | 310/323 |
| 5,760,529 | 6/1998 | Tamai et al. | 310/323 |
| 5,814,919 | 9/1998 | Okumura et al. | 310/323 |
| 5,917,270 | 6/1999 | Tsukimoto et al. | 310/323 |
| 5,949,178 | 9/1999 | Tamai et al. | 310/323 |
| 5,952,766 | 9/1999 | Mukohjima et al. | 310/323.04 |

FOREIGN PATENT DOCUMENTS

| | | | |
|---|---|---|---|
| 6-120580 | 4/1994 | (JP) | H01L/41/09 |
| 9-37573 | 2/1997 | (JP) | H02N/02/00 |

* cited by examiner

*Primary Examiner*—Burton Mullins
(74) *Attorney, Agent, or Firm*—Fitzpatrick, Cella, Harper & Scinto

(57) ABSTRACT

A vibration wave apparatus includes a plurality of vibration member groups. Each vibration member group includes a plurality of vibration members having respective driving portions in which driving vibration waves are generated, where the respective driving portions are arranged at axially opposite sides of the vibration member group and the said plurality of vibration members are disposed coaxially with one another, and a holding member disposed between the respective driving portions of the plurality of vibration members, and arranged to support the vibration member group at a peripheral portion of the holding member. A plurality of contact members are arranged in press contact with the respective driving portions of the plurality of vibration members of each of the plurality of vibration member groups, wherein when the plurality of vibration members are driven so as to generate vibration in the respective driving portions of the plurality of vibration members, the plurality of contact members are rotated in the same direction relative to the plurality of vibration members of the plurality of vibration member groups.

23 Claims, 5 Drawing Sheets

VIBRATION WAVE APPARATUS

BACKGROUND OF THE INVENTION

1. Field of the Invention

This invention relates to a vibration wave motor or a vibration wave apparatus for driving a driven member with a vibration wave motor as a driving source.

2. Related Background Art

As a vibration wave apparatus, there has heretofore been put into practical use a travelling wave type vibration wave motor utilizing flexural vibration generated on an elastic member made of a metal or the like formed, for example, into a ring-like shape or the like, or a bar-like vibration wave motor utilizing the flexural vibration of a vibration member formed into a bar-like shape.

On the other hand, the technique of connecting a plurality of vibration wave motors together to make output torque great has also been proposed (Japanese Patent Application Laid-open No. 9-37573).

Now, a vibration wave motor has as a basic construction a vibration member in which driving vibration is generated, and a contacting member which is provided in press contact with the vibration member. When, for example, the vibration member is a stator, it becomes necessary in utilizing the vibration wave motor as a driving source to fix the vibration member to a fixed member such as a motor case by some method.

For example, in the case of a ring-like vibration wave motor, a ring-like vibration member as a stator is not fixed to a motor case in the outer peripheral portion thereof, and the meshing engagement between a projection formed on the outer diametrical portion of the stator and a groove formed in the inner side of the case provides a rotation stopping mechanism. It utilizes a so-called spline mechanism.

Therefore, the stator is freely movable in a gap formed in the meshing portion between the projection and the groove which constitutes spline coupling and, as a result, there has been a case where backlash occurs there.

Therefore, even if an attempt was made to accurately control the rotation of the contacting member as a rotor, the rotor could not be controlled with accuracy equal to or less than the error due to backlash in movement of the stator/vibration member.

Also, when the outer diametrical portion of the stator and the motor case are fixed, it is conceivable that of vibration in the stator will propagate to the motor case, energy loss will be increased, and the driving efficiency of the motor will deteriorate or the vibration which propagates to the motor case may adversely affect a sensor such as an encoder and surrounding instruments in the form of noise.

Also, there has heretofore been put into practical use as a vibration wave apparatus a travelling wave type vibration wave motor in which an electromechanical energy conversion element, such as a piezoelectric element, adhesively secured to an elastic member made of a metal formed, for example, into a ring-like shape or the like is used as a vibration member and which utilizes flexural vibration excited in the vibration member by a driving signal, such as an alternating signal, being applied to the piezoelectric element, or a bar-like vibration wave motor utilizing the flexural vibration of a vibration member formed into a bar-like shape.

As a system for supporting and fixing the vibration member in the ring-like travelling wave type vibration wave motor, there has been proposed structure in which the vibration member is supported on felt disposed in a motor case to thereby prevent the propagation of vibration to a fixed portion for fixing the vibration member to the case, or structure in which a vibration member itself is made into a ring-like shape and a fixed portion disposed inside it and the vibration member are connected together by a thin plate (sometimes the vibration member and the thin plate and further the fixed portion are made as a unit) to thereby prevent the propagation of vibration to the fixed portion.

On the other hand, with respect to the supporting and fixing features of the vibration member in the bar-like vibration wave motor, there has been proposed structure in which a thin bar (pin) is used coaxially with the bar-like vibration member to connect the vibration member and a fixed portion together and thereby prevent the propagation of vibration to the fixed portion.

SUMMARY OF THE INVENTION

One aspect of the invention is a vibration wave apparatus having a group of vibration members comprising a plurality of vibration members provided with driving portions in which driving waves are formed on the axially opposite sides, the vibration members being disposed coaxially with one another, a plurality of contacting members and a holding member for holding the group of vibration members, the plurality of vibration members and the plurality of contacting members being moved relative to each other in the same direction, and the durability of the apparatus can be improved.

One aspect of the invention is a vibration wave apparatus in which an electro-mechanical energy conversion element is sandwiched between a first elastic member and a second elastic member and a plate-like supporting member is provided at a symmetrical plane position axially intermediate of the first elastic member and the second elastic member, and the propagation of vibration to the supporting member can be minimized.

DESCRIPTION OF THE PREFERRED EMBODIMENTS

Figure 1:
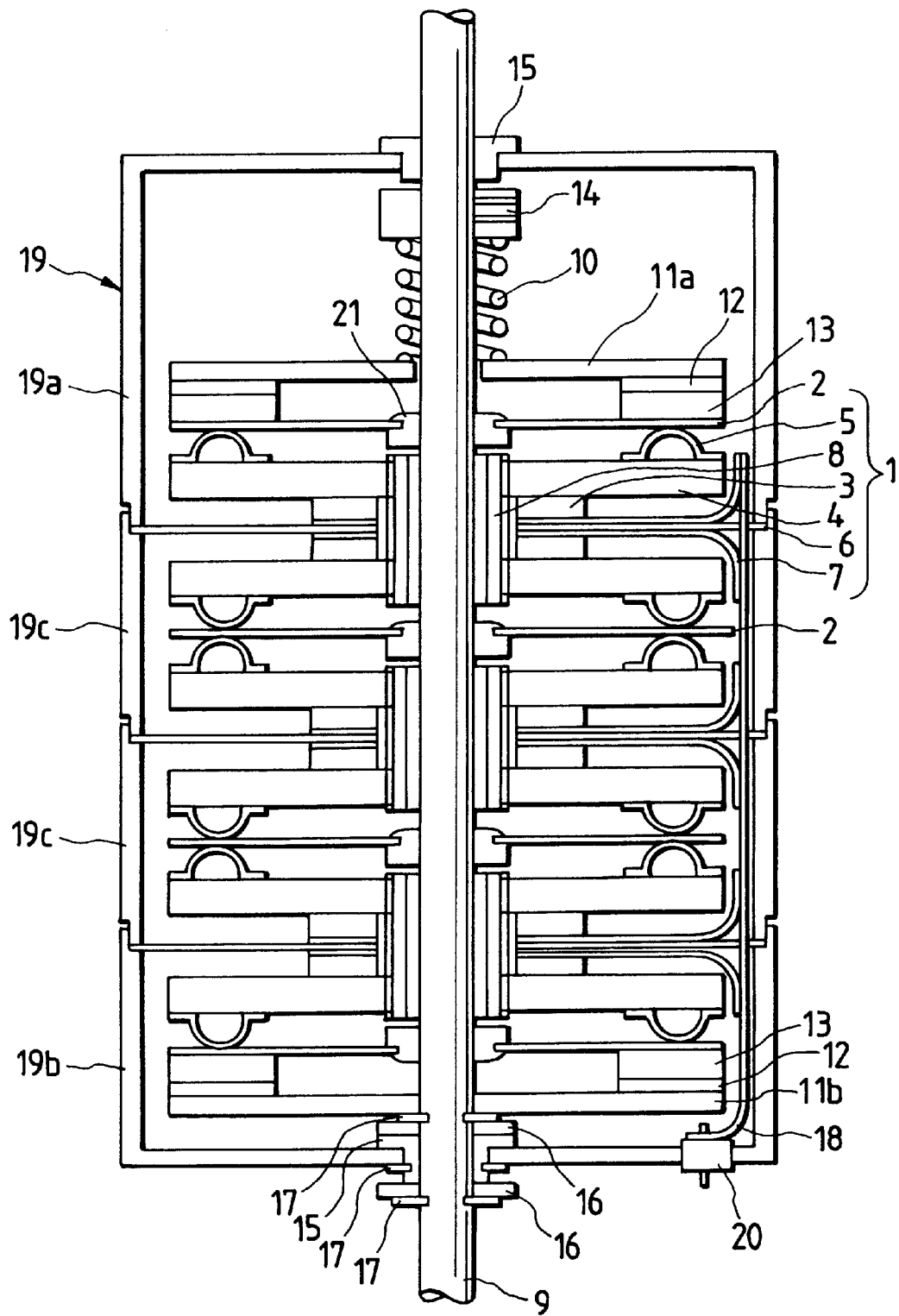
FIG. 1 is a schematic transverse cross-sectional view of a first embodiment of the present invention.

FIG. 1 shows a first embodiment of the present invention.

The reference numeral 1 designates a disc-like stator as a vibration member comprised of piezoelectric elements 3 as electromechanical energy conversion elements, metallic elastic plates 4, projections 5 for enlarging the amplitude of vibration in the rotor driving direction, a supporting and fixing plate 6, flexible printed substrates 7 for connecting piezoelectric elements 3 with a driving circuit, not shown, and a hollow fastening bolt 8. As will be understood with reference to FIG. 2, a pair of flexible printed substrates 7 are disposed between a pair of piezoelectric elements 3 (3a, 3b), the supporting and fixing plate 6 is disposed between the pair of flexible printed substrates 7, from the opposite sides of these, the metallic elastic plates 4 which are a first elastic member 4a and a second elastic member 4b are screwed onto opposing ends of the fastening bolt 8, and are tightly fastened thereto thereby forming a unit, so as to form a stator having driving portions on the axially opposite sides. Referring again to FIG. 1, a plurality of such stators are disposed coaxially with one another and thereby constitute a group of vibration members. In that case, an output shaft 9 disposed in the central portion is inserted through the plurality of fastening bolts 8, which are axially movable.

The reference numeral 2 denotes a rotor as a contacting member rotatably driven by the stator.

The general construction of the vibration wave motor according to the present embodiment is such that a plurality of stators 1 and a plurality of rotors 2 are alternately stacked and the assembly is pressed by a pressing spring 10 to thereby obtain respective frictional forces between the plurality of stators 1 and the plurality of rotors 2.

Each stator 1 is such that the supporting and fixing plate 6 held in the center of the thickness thereof is sandwiched between outer cases 19. Each case 19 is of four-division structure, and intermediate case portions 19c, 19c are provided between case portions 19a and 19b at the opposite ends thereof, and the outer peripheral portion of the supporting and each fixing plate 6 is fixed by a respective fitting type joint portion of these case portions.

Each rotor 2 is caulked and fixed by a rotor fixing ring 21, into which the output shaft 9 is pressed and fixed and is made integral with the rotor fixing ring 21. Rotational torque of each rotor 2 received from each stator 1 is outputted as summed-up torque from the output shaft 9.

A bending force of the vibration from the stator 1 acts on the rotors at the opposite ends of the output shaft 9 and therefore, a back plate 13 and rubber 12 as a vibration attenuating material are adhered onto respective rotors 2 at the opposite ends so that great flexural vibration may not be created in the others.

The back plates 13 and vibration attenuating rubbers 12 provided at the opposite ends are sandwiched between holding-down plates 11a together with 11b, and all stators 1 and all rotors 2, and are pressed together by a pressing coil spring 10 so as to press-contact each adjacent rotor 2 and stator 1. As the supporting and fixing plate 6, a thin plate is used so that the pressing force of the pressing coil spring 10, i.e., the contact pressure among all stators/rotors, may become uniform, and the axial rigidity thereof is made small.

The holding-down plate 11b on the end which is not in contact with the coil spring 10 has its axially downward movement regulated by an E-shaped washer 17.

Slide bearings 15 are formed of a material such as resin which has a small coefficient of friction, and provide smooth rotation of the output shaft 9.

Slide plates 16 are formed of a similar material and are disposed between end branches of the E-shaped washer 17 and the slide bearing 15.

Figure 2:
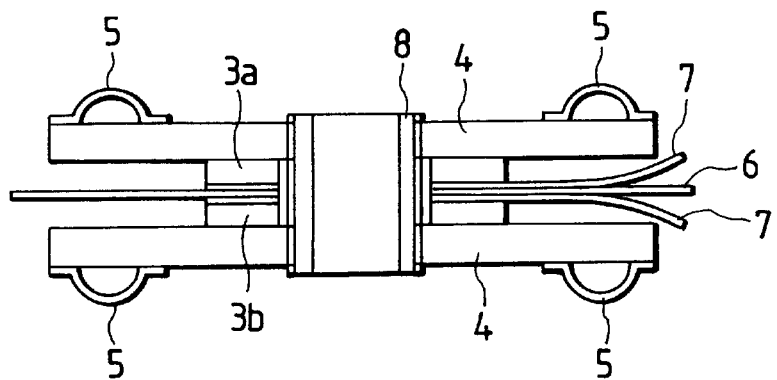
FIG. 2 is a cross-sectional view of the stator of FIG. 1.

FIG. 2 shows the structure of the stator, and as shown there, the stator is comprised of piezoelectric elements 3a, 3b, metallic elastic plates 4a, 4b on opposite sides, projections 5 on the opposite sides for enlarging the amplitude of vibration in the rotor driving direction, a supporting and fixing plate 6, flexible printed substrates 7 connecting the piezoelectric elements 3a, 3b with a driving circuit, not shown, via a flexible printed substrate connector 18 and a contact 20, and a hollow fastening bolt 8. As described above, the two metallic elastic plates 4a, 4b, the two piezoelectric elements 3a, 3b and the two flexible substrates 7 respectively are disposed in that order from the outside, the supporting and fixing plate 6 is disposed on the symmetrical central plane thereof, and these parts are held and fixed integrally with one another by the hollow bolt 8.

Figure 3A:
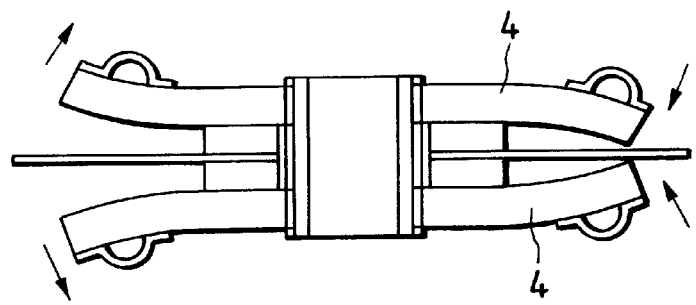
FIGS. 3A and 3B are explanatory views showing that the vibration form of the stator is vertically symmetric.
Figure 3B:
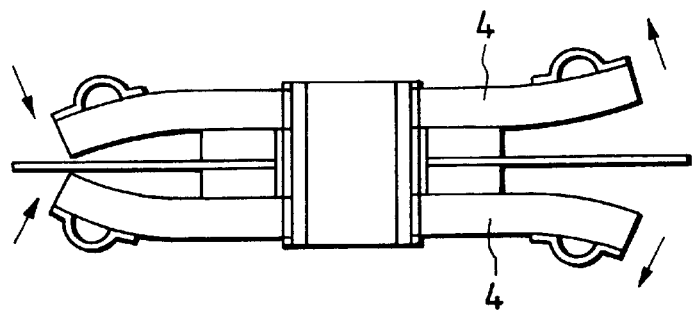
Figure 4A:
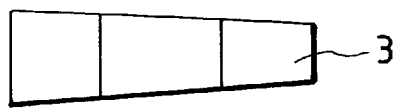
FIGS. 4A and 4B show a modification of the piezoelectric element of FIG. 1.
Figure 4B:

When the piezoelectric elements 3 (3a, 3b) repeat their deformation in the direction of thickness as shown in FIGS. 4A and 4B, the metallic elastic members 4 create a vibration which repeats the deformation as shown in FIGS. 3A and 3B. FIGS. 3A, 3B, 4A and 4B exaggeratively depict the deformation to make the manner of vibration readily understood.

This vibration results in deformation in which the opposite sides (the upper and lower portions in FIG. 1) of the supporting and fixing plate 6 are moved symmetrically thereto and therefore, the supporting and fixing plate 6 which is just the plane of symmetry theoretically does not vibrate at all. Accordingly, even if this supporting and fixing plate 6 is supported and fixed, the vibration of the vibration member is not propagated to the fixed portion or may be at a very small level, and the problem as in the prior art can be prevented from arising.

Figure 5A:
FIGS. 5A, 5B, 5C and 5D are perspective views showing the shapes of the projected portions of a metallic plate.
Figure 5B:
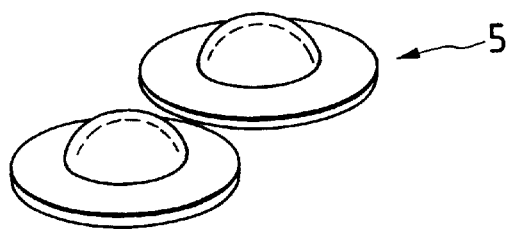
Figure 5C:
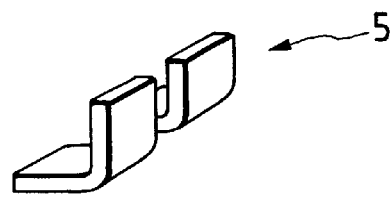
Figure 5D:
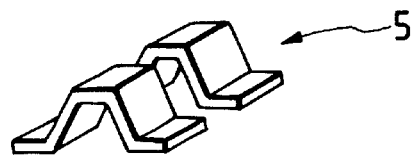

The amplitude enlarging projections 5 are not restricted to ones in the present embodiment as shown in FIG. 5A, wherein stainless plates made into an arch shape by a press metal plate are circumferentially arranged side by side on the metallic elastic plate 4 and fixed, but may be ones as shown in FIGS. 5B, wherein caps are laid upside down, or L-shaped ones as shown in FIG. 5C or trapezoidal ones as shown in FIG. 5D, and the fixing thereof may be done by any method such as adhesive securing, brazing or screwing.

In the case of the projections in the present embodiment shown in FIG. 5A, it is desirable that the diameter of the arch and the thickness of the plate are designed as such a suitably elastically deformable spring that a problem such as the production of an abnormal sound will not arise when the projections contact with the rotor 2.

Also, a material of good wear resistance can be applied to or stuck on the tip ends of the projections to thereby improve the wear resistance of the projections.

Figure 6A:
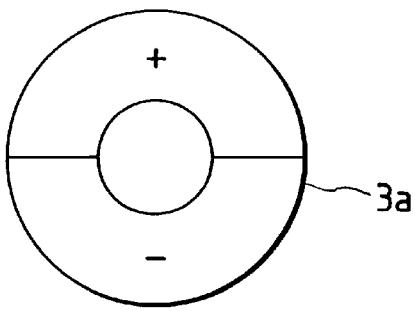
FIGS. 6A and 6B show the phase relation between the polarization polarity and disposition of the piezoelectric element.
Figure 6B:
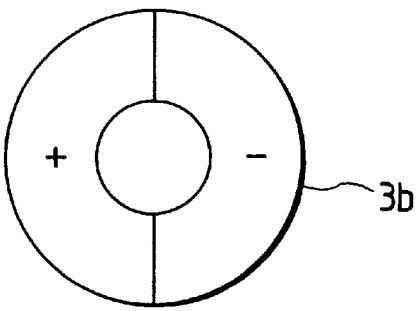

FIGS. 6A and 6B show the relation between the polarization polarities and relative phase of the two piezoelectric elements 3a and 3b. It is well known that when an AC voltage (alternating signal) phase-shifted in time is applied to the piezoelectric elements thus polarization-processed and disposed in position where their polarization areas are shifted, the vibration as shown in FIGS. 3A and 3B become travelling waves that rotate around the vibration member.

Figure 8A:
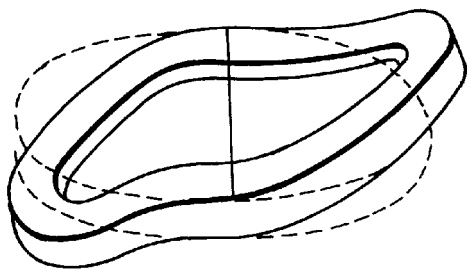
FIGS. 8A and 8B show the forms of the vibration of a metallic elastic plate.

In the case of piezoelectric elements which have shapes and polarized states as shown in FIGS. 6A and 6B, the metallic elastic plate 4 is deformed and vibrated into a shape having a nodal diameter as shown in FIG. 8A.

Figure 7A:
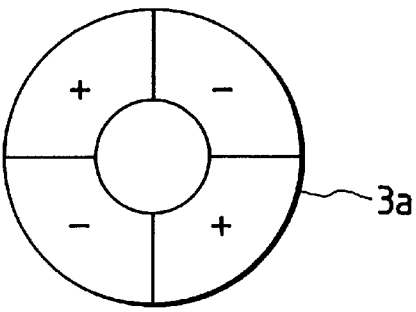
FIGS. 7A and 7B show the phase relation between the polarization polarity and disposition of another piezoelectric element.
Figure 7B:
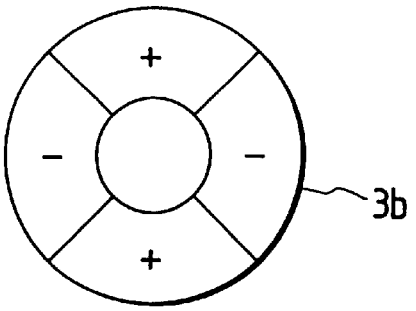
Figure 8B:
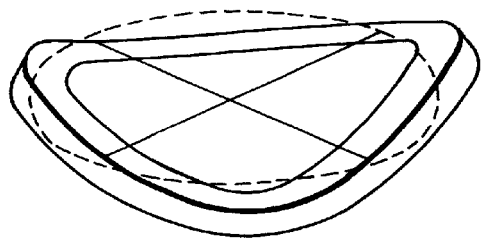

Also, in the case of a piezoelectric element polarization-processed and disposed with a positional deviation as shown in FIGS. 7A and 7B, the metallic elastic plate 4 is deformed and vibrated into a shape having two nodal diameters as shown in FIG. 8B. Again in this case, the upper and lower metallic elastic plates 4 are symmetrically deformed and therefore, the supporting and fixing plate 6 does not vibrate at all.

As the piezoelectric element, use may be made of a laminated type piezoelectric element (a piezoelectric element having an electrode film formed among a plurality of piezoelectric ceramics) used in a bar-like vibration wave motor known in Japanese Patent Application Laid-Open No. 6-120580, etc. The number of lamination layers, the diametral dimension, the number of divided electrodes and the electrode division pattern can be suitably changed in accordance with the design of the vibration wave motor.

Figure 9:
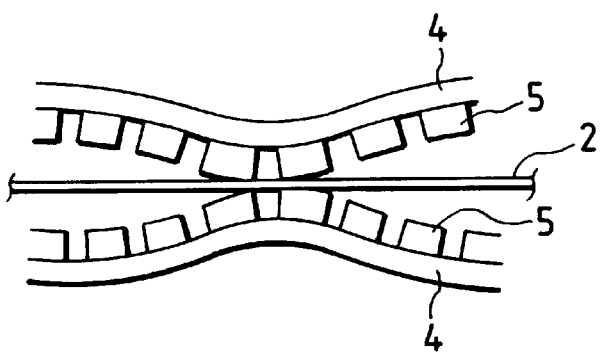
FIG. 9 shows the state of contact between the stator and a rotor.

FIG. 9 shows a typical state of contact between two stators 1 and a rotor 2 sandwiched therebetween. The frequencies and phases of vibration of the upper and lower stators are in accord with each other and therefore, a bending force is not applied to the rotor 2. Accordingly, great flexural rigidity is not necessary for the rotor and therefore, the thickness as in the prior art becomes unnecessary and thus, the rotor may be a very thin rotor. Also, as in the case of the supporting and fixing plate 6, the rotor 2 is suitable for using a thin plate making axial rigidity small so that the pressing force of the pressing coil spring 10, i.e., the contact pressure between all stators/rotors, may become uniform.

To bring the frequencies and phases of the plurality of stators into accord with each other as described above, it is necessary to make the difference between the natural frequencies of the respective stators small. The difference may desirably be within 2%. Also, all the stators are driven at the same frequency and therefore, the same driving voltage can be applied to all the stators. Accordingly, a single driving circuit may be used.

While in the above-described embodiment, the vibration member is fixed and the contacting member is movable, conversely the vibration member may be movable and the contacting member may be fixed.

As described above, according to the above-described embodiment, the vibration member and the contacting member are made into multiple layers, thereby the area of the frictional contact portion can be made large and therefore, the stress applied to the frictional material can be decreased to thereby decrease the wear thereof. Thus, there can be achieved a vibration wave apparatus such as a vibration wave motor having a long life and long durability.

Also, the area of the frictional contact portion is large and therefore, the frictional force can be made great, and there can be achieved a vibration wave apparatus such as a vibration wave motor having great output torque.

Also, the pressing means rotates with the output shaft and therefore, the bearing for receiving the pressing force as in the vibration wave motor according to the prior art is unnecessary.

Also, a thin plate is disposed on the symmetrical central plane intermediate of the first elastic member and the second elastic member, and the outer diametrical portion of this thin plate is fixed to thereby support and fix the vibration member. Therefore, there can be realized a vibration wave apparatus such as a vibration wave motor having high driving efficiency and great output torque.

Also, vibration is not propagated to the outside environment. Therefore, the surrounding instruments are not adversely affected, and a system of high reliability can be made.

Also, all the vibration members are driven by the same frequency. Therefore, the same driving voltage can be applied to all the vibration members. Accordingly, a single driving circuit may be used.

Also, the frequencies and phases of the vibrations of all the vibration members are in accord with one another. Therefore, the contacting member or the moving member may be very thin and, thus, the apparatus becomes compact and the manufacturing cost thereof is low.

Also, the torque characteristic of the output can be made great or small simply by increasing or decreasing the number of layers of the vibration members and the contacting member or the moving member. Accordingly, a motor of diverse performance can be made by a combination of one kind of vibration members. One kind of vibration members can be used for diverse needs and therefore, even when there exists a need for many kinds of devices and small quantity production is available, the vibration members can be produced in large quantities and the production cost can be reduced.

Also, each vibration member is vibrated symmetrically in the direction of thickness thereof and the supporting member is disposed on the symmetrical central plane thereof. Therefore, the supporting member theoretically does not vibrate, and the problem that vibration is propagated to the fixing portion for supporting and fixing the vibration member can be solved, and there can be realized a vibration wave apparatus and a vibration wave driving apparatus in which the vibration member can be firmly fixed and which are good in efficiency.

What is claimed is:

1. A vibration wave apparatus comprising:
   a plurality of vibration member groups, each vibration member group comprising:
      a plurality of vibration members having respective driving portions in which driving vibration waves are generated, said respective driving portions being arranged at axially opposite sides of said vibration member group, said plurality of vibration members being disposed coaxially with one another; and
   a holding member disposed between said respective driving portions of said plurality of vibration members, and arranged to support said vibration member group at a peripheral portion of said holding member; and
   a plurality of contact members arranged in press contact with said respective driving portions of said plurality of vibration members of each of said plurality of vibration member groups, wherein when said plurality of vibration members are driven so as to generate vibration in said respective driving portions of said plurality of vibration members, each of said plurality of contact members is rotated in the same direction relative to said plurality of vibration members of said plurality of vibration member groups.

2. A vibration wave apparatus according to claim 1, further comprising a case member, wherein the outer peripheral portion of each holding member is fixed to said case member.

3. A vibration wave apparatus according to claim 2, further comprising an output shaft to which said plurality of contact members are fixed, said output shaft being rotated by rotation of said plurality of contact members.

4. A vibration wave apparatus according to claim 3, further comprising a bearing member provided at said case member, wherein said output shaft is supported by said bearing member at said case member.

5. A vibration wave apparatus according to claim 1, further comprising an output shaft to which said plurality of contact members are fixed, said output shaft being rotated by rotation of said plurality of contact members.

6. A vibration wave apparatus according to claim 5, wherein each of said plurality of vibration members has a hollow central portion, and said output shaft is inserted through the hollow central portion of each of said plurality of vibration members.

7. A vibration wave apparatus according to claim 6, further comprising a spring member that biases said plurality of contact members and said plurality of vibration members in press contact, wherein said spring member is rotatable with said output shaft.

8. A vibration wave apparatus according to claim 5, wherein said plurality of vibration members are driven by a single driving circuit.

9. A vibration wave apparatus according to claim 1, further comprising a spring member that biases said plurality of contact members and said plurality of vibration members in press contact, where said spring member is disposed only on one side of said plurality of vibration member groups.

10. A vibration wave apparatus according to claim 1, further comprising a spring member that biases said plurality of contact members and said plurality of vibration members in press contact, wherein a pressing force of said spring member produces a force for sandwiching axially opposite sides of a contact member between two vibration members.

11. A vibration wave apparatus according to claim 1, wherein each vibration member group further comprises electromechanical energy conversion elements sandwiched among said plurality of vibration members.

12. A vibration wave apparatus according to claim 11, wherein said plurality of vibration members are driven by a single driving circuit.

13. A vibration wave apparatus according to claim 1, wherein each vibration member group further comprises electromechanical energy conversion elements disposed among said plurality of vibration members and on opposite sides of said holding member of said vibration member group.

14. A vibration wave apparatus according to claim 13, wherein said plurality of vibration members are driven by a single driving circuit.

15. A vibration wave apparatus according to claim 1, wherein said plurality of vibration members are driven by a single driving circuit.

16. A vibration wave apparatus comprising:
a first elastic member having a disc-like shape;
a second elastic member having a disc-like shape and disposed coaxially with said first elastic member;
a plurality of hollow vibration members, each hollow vibration members including at least one electromechanical energy conversion element, said plurality of vibration members being sandwiched between said first elastic member and said second elastic member;
a plate member disposed on a symmetrical central plane intermediate said first elastic member and said second elastic member;
a case member to which an outer diametrical portion of said plate member is fixed, thereby supporting said first elastic member, said second elastic member and said plurality of hollow vibration members; and
a plurality of hollow moving members arranged in press contact with said first elastic member and said second elastic member and fixed to a frictionally driven output shaft, wherein when alternating signals having a phase difference therebetween are applied to respective electromechanical energy conversion elements disposed with a positional phase difference therebetween, each electromechanical energy conversion element is displaced in the direction of thickness thereof, and generates circular or elliptical surface motions with reversed phases on opposing surfaces of said first elastic member and said second elastic member.

17. A vibration wave apparatus according to claim 16, further comprising a single pressing mechanism that biases said plurality of hollow vibration members and said plurality of moving members in press contact.

18. A vibration wave apparatus according to claim 16, wherein said plurality of vibration members are driven by a single driving circuit.

19. A vibration wave apparatus having electromechanical energy conversion elements sandwiched between a first elastic member and a second elastic member, and a vibration member for forming circular or elliptical motion in driving portions of said first elastic member and said second elastic member by the application of an alternating signal to said electromechanical energy conversion elements, said vibration wave apparatus comprising a supporting member formed by a thin plate member provided at a symmetrical plane position axially intermediate said first elastic member and said second elastic member, said electromechanical energy conversion elements being disposed on opposite sides of said supporting member, and a flexible printed substrate in electrical connection with said electromechanical energy conversion elements and disposed between said supporting member and each of said electromechanical energy conversion elements.

20. A vibration wave apparatus according to claim 19, wherein respective circular or elliptical motions formed in driving portions of said first elastic member and said second elastic member are reversed in phase.

21. A vibration wave apparatus according to claim 19, wherein an outer peripheral portion of said supporting member protrudes outwardly of said first elastic member and said second elastic member.

22. A vibration wave apparatus having electromechanical energy conversion elements sandwiched between a first elastic member and a second elastic member disposed coaxially with each other, and a vibration member for forming circular or elliptical motion in driving portions of said first elastic member and said second elastic member by the application of an alternating signal to said electromechanical energy conversion elements, said vibration wave apparatus comprising a supporting member formed by a thin plate member provided at a symmetrical plane position axially intermediate said first elastic member and said second elastic member, wherein said first elastic member and said second elastic member are connected together at central portions thereof, and said energy conversion elements, said supporting member and a flexible printed substrate are sandwiched and fixed between said first elastic member and said second elastic member.

23. A vibration wave apparatus having electromechanical energy conversion elements sandwiched between a first elastic member and a second elastic member, and a vibration member for forming circular or elliptical motion in driving portions of said first elastic member and said second elastic member by the application of an alternating signal to said electromechanical energy conversion elements, said vibration wave apparatus comprising a supporting member formed by a thin plate member provided at a symmetrical plane position axially intermediate said first elastic member and said second elastic member, said electromechanical energy conversion elements being disposed on opposite sides of said supporting member, wherein said first elastic member and said second elastic member are connected together at central portions thereof, and said energy conversion elements, said supporting member and a flexible printed substrate are sandwiched and fixed between said first elastic member and said second elastic member.

* * * * *

UNITED STATES PATENT AND TRADEMARK OFFICE
CERTIFICATE OF CORRECTION

PATENT NO.   : 6,198,201 B1
DATED        : March 6, 2001
INVENTOR(S)  : Ichiro Okumura Page 1 of 1

It is certified that error appears in the above-identified patent and that said Letters Patent is hereby corrected as shown below:

Column 1,
Line 46, "of" should be deleted.

Column 3,
Line 51, "a" should read -- the --.

Column 4,
Line 26, "thereto" should read -- thereto, --.

Column 5,
Line 11, "tral" should read -- trical --.

Column 6,
Line 38, "and" should be deleted.

Signed and Sealed this

Twenty-second Day of January, 2002

Attest:

JAMES E. ROGAN
Attesting Officer        Director of the United States Patent and Trademark Office